(No Model.) 2 Sheets—Sheet 1.
A. L. PARCELLE.
ELECTROMOTOR TRACTION WHEEL.
No. 433,180. Patented July 29, 1890.
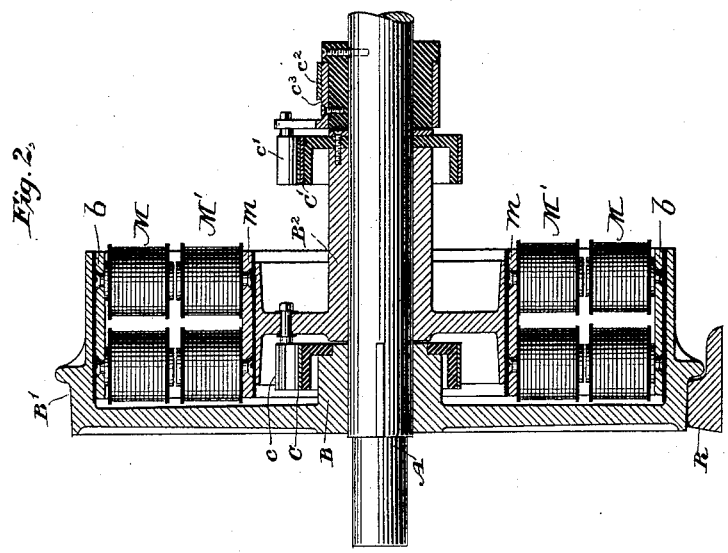
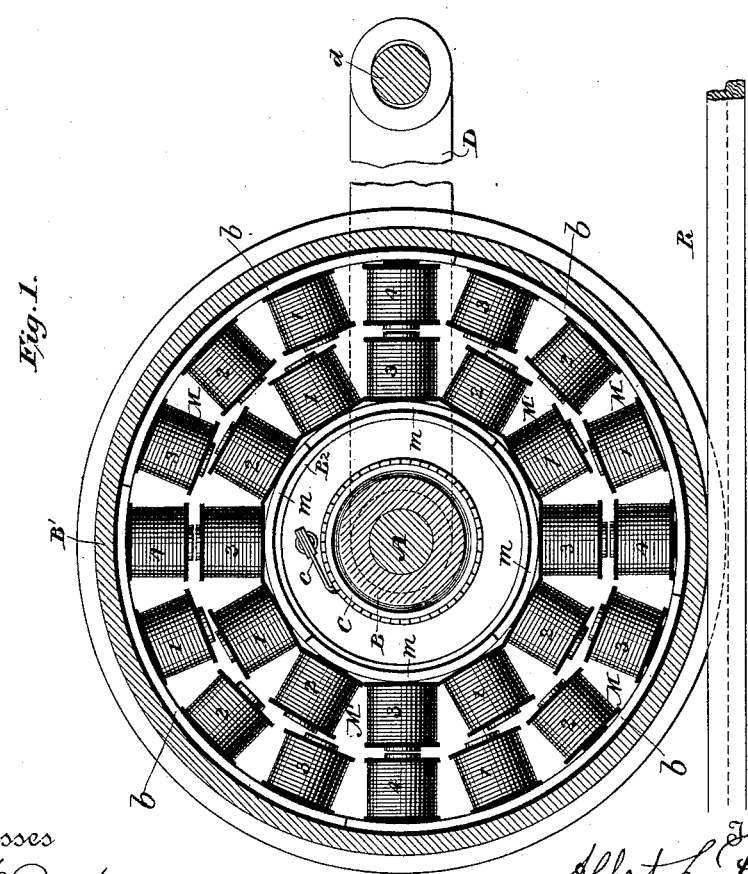
Witnesses
Geo. W. Breck
Edward Thorpe
Inventor
Albert L. Parcelle
By his Attorneys
Baldwin, Davidson & Wight

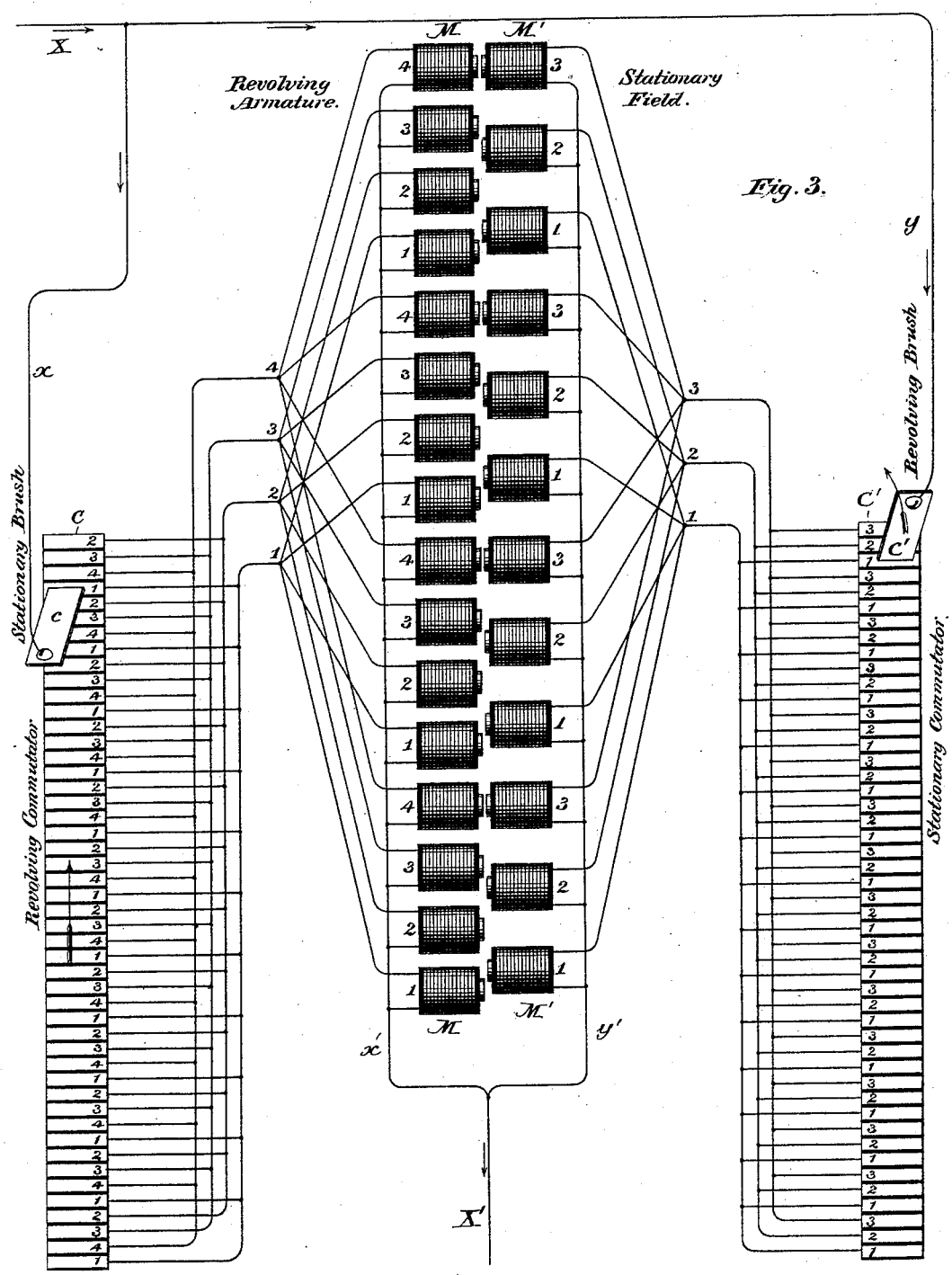

UNITED STATES PATENT OFFICE.

ALBERT L. PARCELLE, OF BOSTON, MASSACHUSETTS, ASSIGNOR TO THE FLORENCE MOTOR COMPANY OF MAINE.

ELECTRO-MOTOR TRACTION-WHEEL.

SPECIFICATION forming part of Letters Patent No. 433,180, dated July 29, 1890.

Application filed August 14, 1889. Serial No. 320,690. (No model.)

*To all whom it may concern:*

Be it known that I, ALBERT L. PARCELLE, a citizen of the United States, and a resident of Boston, county of Suffolk, State of Massachusetts, have invented an Improved Electro-Motor Traction-Wheel, of which the following is a specification.

The object of my invention is to provide an electric motor in the form of a wheel that may serve as a carrying and driving wheel for vehicles. With this object in view the revolving or armature magnets or coils of the motor are positively connected with or carried directly by the rim of the traveling wheel which is therefore revolved with the armature-magnets. With ordinary electric motors in order to obtain efficiency a high speed of revolution is required, and it would not for that reason be very desirable to use such motors in the manner above suggested. I prefer therefore to employ a particular type of motor, herein illustrated and described, for it may be driven slowly or at a relatively high speed, and exerts practically the same power at all speeds.

The subject-matter claimed is hereinafter specifically designated.

In the accompanying drawings, Figure 1 is a view, partly in elevation and partly in section, showing my invention embodied in the form of a car-wheel; Fig. 2, a vertical longitudinal section of the same; and Fig. 3, a diagram illustrating one way in which the circuit-connections may be made.

I will first describe the specific construction shown in Figs. 1 and 2. A represents a car-axle; B B', the revolving hub and rim of the car-wheel turning therewith and running upon rail a R, and B² the non-rotating hub mounted on the car-axle and held against rotation by an arm D extending from it and embracing an adjoining axle d. C is a commutator carried by and revolving with the hub B, and c a stationary brush mounted upon the fixed frame or hanger and bearing on the commutator. C' is the stationary commutator mounted on the frame, and c' a revolving brush bearing thereon carried by the rotating hub. The revolving magnets M are carried upon magnetically-insulated iron sector-plates b secured to the inner face of the rim of the wheel. They are here shown as double-pole horseshoe magnets, and have their poles arranged transversely to the rim of the wheel. The stationary or field magnets M' are mounted upon similar sector-plates m carried upon the outer face of the stationary hub B².

The diagram shows the circuit-connections and manner of operation of the revolving and stationary magnets. The revolving armature magnets or coils M are numbered consecutively 1 2 3 4, in four series, sixteen magnets being shown. The metallic commutator-strips of the commutator C, forty-eight being shown, are similarly numbered, and all the magnets or coils of like number are connected with all the commutator-strips bearing the same number. The commutator C revolves with the armature, as indicated by the arrow, and the brush c is stationary.

There are twelve stationary field magnets or coils M', and these are consecutively numbered 1 2 3 in four series. The stationary commutator C' has 48 strips which are correspondingly numbered, and all the magnets of like number are connected with all the correspondingly-numbered strips in the commutator. c' is the revolving brush for this commutator. In this diagram the revolving and stationary coils are connected in parallel. The current enters at X, where the circuit divides into parallel branches. The branch x includes the commutator-brush c and the metallic strips of the commutator C, the various revolving or armature coils in multiple, and wire x' leading to the conductor X'. The other branch y includes the brush c', the metallic strips of the commutator C', the various stationary or field coils in multiple, and wire y' to the conductor X'. The coils or magnets in the revolving armature are greater in number than those in the field. Both commutator-brushes being upon strips numbered 1, the groups of coils 1 1, in field and armature, which are, as shown, in a more advantageous relation to each other than those bearing any of the other numbers, attract each other, the armature being rotated in the direction of the arrow. As the armature moves forward the coils or magnets in the groups 1 1 approach each other and the commutators transfer the circuits to the groups 2 2, preferably before the axes of the groups numbered 1 become coincident. The groups 2 2 will then have assumed about the relation that the groups 1 1 occupy in the drawings—that is, the groups 2 2 are now in a more advantageous position, and they alone are active. In like manner, as will be plain from the diagram, the groups 3 3 act, then group 4 in the revolving armature and group 1 in the field, then group 1 in the revolving armature and group 2 in the field, and so on continuously. Each group of coils is active when it is in a position with reference to another group to produce a maximum result or power, or nearly so, from the current employed, and each maximum result thus produced acts through a comparatively small portion of the revolution of the revolving armature.

By a motor of this character the full power of the current is utilized to the greatest advantage, as only magnets or coils sustaining the most favorable relation to each other are successively thrown into action. Thus a nearly-uniform pull equal, or nearly so, to the maximum effect the current is capable of producing is practically constantly applied to the driven rim of the wheel, and as the motor gives its maximum power for all speeds, I am enabled to apply its power direct to the wheel, and thus dispense with speed-reducing gear.

In Figs. 1 and 2 current derived from an overhead conductor or any other conductor or a source of electric energy on the vehicle may enter at the rubber $c^2$ and at the brush $c$, thence through the commutators and series of coils to the revolving rim or frame of the wheel and non-rotary hub and out by the rail R; but of course the magnets may be connected in other ways than shown in the diagram, and the rail R need not form a part of the circuit, but any return-conductor may be used, and where the source of energy is upon the vehicle, of course the current, after passing through the motor in any desired manner, is returned directly to the source.

Any desired number of such motor-wheels may be provided for a car or other vehicle to be propelled thereby.

I am aware that electromotors of various forms are old. I am also aware that it is old to mount such a motor on a car wheel and axle. I do not, therefore, broadly claim such organization. Neither do I claim the particular motor herein shown, *per se*, as that is claimed in Parkhurst's application, Serial No. 320,699, filed August 14, 1889. Adams's patent, No. 300,827, dated June 24, 1884, shows a Pacinotti ring field-magnet rigidly secured to a car-wheel turning with its axle and a similar armature mounted loosely on the axle, the two magnets being connected by complicated interposed gearing, so as to communicate motion from one to the other. The comparatively greater simplicity and efficiency of my organization is obvious.

Having thus fully described the construction, organization, and operation of my improved electromotor traction-wheel, what I claim therein as new, and as of my own invention, is—

The combination, substantially as hereinbefore set forth, of the revolving axle, the wheel fixed thereon, its overhanging or flanged rim, the series of groups of armature-magnets radially and circumferentially mounted on the inner side of said rim, a non-rotating hub or frame carrying a corresponding series of smaller groups of field-magnets radially, circumferentially, and concentrically arranged within the other groups in the same vertical plane, a commutator revolving with the hub against a brush fixed on the frame, a stationary commutator mounted on the fixed part of the frame, a brush carried by the rotating hub, and circuit-connections to shift the current successively through the corresponding magnets of each group to produce a continuous pull on the magnets without intervening gearing.

In testimony whereof I have hereunto subscribed my name.

ALBERT L. PARCELLE.

Witnesses:
WM. A. MACLEOD,
ROBERT WALLACE.